United States Patent
Nagami (10) Patent No.: US 9,197,777 B2
(45) Date of Patent: Nov. 24, 2015

(54) IMAGE PROCESSING DEVICE AND IMAGE PROCESSING UNIT INCLUDING PROVIDING MODES FOR SUPPLYING POWER TO IMAGE PROCESSING UNITS

(71) Applicant: Masahiro Nagami, Nagoya (JP)

(72) Inventor: Masahiro Nagami, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/753,593

(22) Filed: Jan. 30, 2013

(65) Prior Publication Data

US 2013/0194602 A1 Aug. 1, 2013

(30) Foreign Application Priority Data

Jan. 31, 2012 (JP) ................. 2012-018622

(51) Int. Cl.
 *H04N 1/00* (2006.01)
(52) U.S. Cl.
 CPC ........ *H04N 1/00896* (2013.01); *H04N 1/00952* (2013.01); *H04N 2201/0091* (2013.01)
(58) Field of Classification Search
 USPC ................................. 358/1.15–1.16
 See application file for complete search history.

(56) References Cited

U.S. PATENT DOCUMENTS

| | | | | |
|---|---|---|---|---|
| 5,793,124 A | * | 8/1998 | Mitzaki ..................... | 713/300 |
| 2003/0140260 A1 | * | 7/2003 | Kizawa et al. ............ | 713/300 |
| 2005/0066209 A1 | * | 3/2005 | Kee et al. .................. | 713/323 |
| 2005/0180769 A1 | | 8/2005 | Morioka et al. | |
| 2006/0101294 A1 | * | 5/2006 | Lee et al. ................... | 713/300 |
| 2008/0114996 A1 | * | 5/2008 | Suzuki ....................... | 713/320 |
| 2011/0208986 A1 | | 8/2011 | Soga | |
| 2011/0249291 A1 | | 10/2011 | Tsuzuki et al. | |
| 2011/0276813 A1 | | 11/2011 | Kamijima | |

FOREIGN PATENT DOCUMENTS

| | | |
|---|---|---|
| JP | 2003-076451 A | 3/2003 |
| JP | 2005-035138 A | 2/2005 |
| JP | 2005234784 A | 9/2005 |
| JP | 2006-015571 A | 1/2006 |
| JP | 2010184418 A | 8/2010 |
| JP | 2011-170709 A | 9/2011 |
| JP | 2011-223387 A | 11/2011 |
| JP | 2011-235493 A | 11/2011 |
| JP | 2011251532 A | 12/2011 |

OTHER PUBLICATIONS

Feb. 10, 2015—(JP) Notice of Reasons for Rejection—App 2012018622.

* cited by examiner

*Primary Examiner* — Benny Q Tieu
*Assistant Examiner* — Michael Y Tzeng
(74) *Attorney, Agent, or Firm* — Banner & Witcoff, Ltd.

(57) ABSTRACT

An image processing device includes a power supply unit, an operation unit, and an image processing unit. The power supply unit supplies power in first power supply mode or second power supply mode. The operation unit receives power from the power supply unit in first or second power supply mode and accepts an input from a user. The image processing unit receives the power if the power supply unit is in first power supply mode. At least one of the operation unit and the image processing unit determines whether a predetermined condition is satisfied if the power supply unit is in first power supply mode. At least one of the operation unit and the image processing unit is configured to perform a shutoff process to shut off power supply to at least one of electronic components in the image processing device if the predetermined shutoff condition is satisfied.

16 Claims, 4 Drawing Sheets

IMAGE PROCESSING DEVICE AND IMAGE PROCESSING UNIT INCLUDING PROVIDING MODES FOR SUPPLYING POWER TO IMAGE PROCESSING UNITS

CROSS REFERENCE TO RELATED APPLICATION

The application claims priority from Japanese Patent Application No. 2012-18622 filed on Jan. 31, 2012. The entire content of this priority application is incorporated herein by reference.

TECHNICAL FIELD

The present disclosure relates to technologies for switching modes of power supply to an image processing unit configured to perform image data processing.

BACKGROUND

In a known image processing device including an image processing unit configured to perform image data processing, multiple modes may be provided for supplying power to the image processing unit to reduce power consumption. For instance, in a multifunction device including a main CPU and a sub CPU, multiple power supply modes for supplying power to those CPUs at different power consumption levels may be provided. In one of the modes in which the power consumption level is set at the lowest, the power supply to the main CPU is shut off and the power is only supplied to the sub CPU. The sub CPU determines whether an input from a user is received.

The image processing device may be idle without receiving an input from the user or image data from an external device while power remains on. In such a case, the power supply to the image processing unit may not be needed. However, in the known image processing device, the power is supplied to the sub CPU in power supply mode in which the power consumption level is set at the lowest. Therefore, the power consumption is not sufficiently reduced.

According to technologies described herein, power consumption while an image processing device is turned on can be reduced in comparison to a configuration in which power is continuously supplied to an image processing unit that performs image data processing.

SUMMARY

An image processing device includes electronic components. The image processing device includes a power supply unit, an operation unit, and an image processing unit. The power supply unit is configured to supply power to the electronic components in power supply mode that switches between first power supply mode and second power supply mode. The operation unit includes at least one of the electronic components. The operation unit is configured to accept an input from a user, and receive power from the power supply unit in first power supply mode and second power supply mode. The image processing unit includes at least one of the electronic components. The image processing unit is configured to perform image data processing. The image processing unit is further configured to receiver power from the power supply unit if the power supply unit is in first power supply mode. At least one of the operation unit and the image processing unit is configured to determine whether a predetermined shutoff condition is satisfied if the power supply unit is in first power supply mode. At least one of the operation unit and the image processing unit is configured to perform a shutoff process to shut off power supply from the power supply unit to at least one of the electronic components if the predetermined shutoff condition is satisfied.

An image processing unit is to be installed in an image including an operation unit configured to accept an input from a user and a power supply unit configured to supply power to the image processing unit. The image processing unit includes a power receiving unit and a controller. The power receiving unit is configured to receive power from the power supply unit of the image processing device. The controller is configured to receive power from the power receiving unit, to determine whether a predetermined shutoff condition is satisfied, and output a notification signal to shut off the power supply to the power receiving unit if the predetermined shutoff condition is satisfied.

DETAILED DESCRIPTION

An illustrative aspect of the present invention will be explained with reference to FIGS. 1 through 4. An image processing unit 1 can be installed in different models of image processing devices and configured to perform processes appropriate for the models of image processing devices. In the following description, a multifunction device 2 and a printer 3 are illustrated as example models of those image processing devices. The multifunction device 2 has a printing function, a scanning function, and a copying function. The printer 3 only has a printing function. Processes performed by the image processing unit 1 installed in the multifunction device 2 and processes performed by the image processing unit 1 installed in the printer 3 will be explained. In the drawings, solid arrows indicate signal lines that transmit control signals, and dashed arrows indicate power supply lines.

Configuration of Image Processing Unit 2

Figure 1:
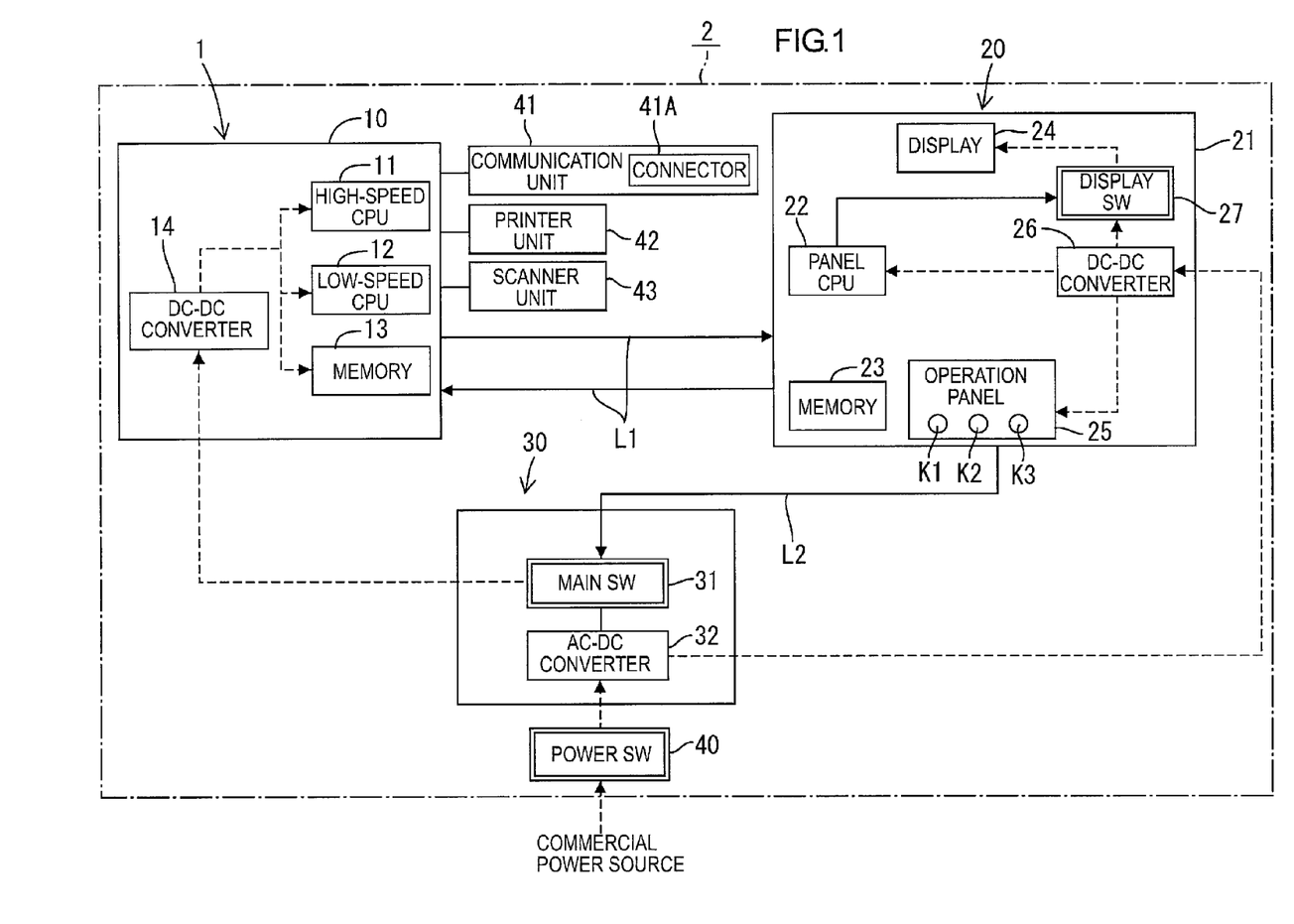
FIG. 1 is a block diagram illustrating an electrical configuration of a multifunction device 2 according to an aspect of the present invention.

As illustrated in FIG. 1, the image processing unit 1 includes a main board 10, a high-speed CPU 11 and a low-speed CPU 12, a memory 13, and a DC-DC converter 14. The high-speed CPU 11, the low-speed CPU 12, the memory 13, and the DC-DC converter 14 are mounted on the main board 10. The high-speed CPU 11 has a processing capacity higher than that of the low-speed CPU 12 and the power consumption thereof per unit time is larger than that of the low-speed CPU 12. The maximum clock speed of the high-speed CPU 11 may be 1 GHz and the power consumption thereof is 50 W. The maximum clock speed of the low-speed CPU 12 is 300 MHz and the power consumption thereof is 20 W. The image processing unit 1, the high-speed CPU 11, and the low-speed CPU 12 may be considered as examples of an image processing unit, a first CPU, and a second CPU, respectively.

The memory 13 may include a RAM and a ROM. The memory 13 stores various programs for controlling operation of the multifunction device 2 or the printer 3. The high-speed CPU 11 and the low-speed CPU 12 control components of the multifunction device 2 or the printer 3 according to the programs read out of the memory 13. The medium on which the various programs are stored is not limited to the RAM. A CD-ROM, a hard disk drive, or a non-volatile memory, a flash memory may be used. Power supply units 30 and 60 are installed in the multifunction device 2 and the printer 3, respectively. The DC-DC converter 14 converts a direct current (DC) power supplied by a power supply unit 30 or 60 to predetermined-volt DC power. The converted DC power is supplied to the high-speed CPU 11, the low-speed CPU 12, and the memory 13.

The multifunction device 2 and the printer 3 may be considered as a first model of image processing devices and a second model of image processing devices. The multifunction device 2 will be explained first and then the printer 3 will be explained.

Configuration of Multifunction Device

As illustrated in FIG. 1, the multifunction device 2 includes the image processing unit 1, an operation unit 20, the power supply unit 30, a communication unit 41, a printer unit 42, and a scanner unit 43. In the multifunction device 2, the operation unit 20 has a function for switching the power supply unit 30 between first power supply mode and second power supply mode according to a notification signal output by the image processing unit 1. In first power supply mode, the power is supplied to the image processing unit 1 and the operation unit 20. In second power supply mode, the power supply to the image processing unit 1 is shut off and the power is only supplied to the operation unit 20.

The operation unit 20 is connected to the image processing unit 1 via communication lines L1 such that the operation unit 20 can exchange data with the image processing unit 1. The operation unit 20 includes a panel board 21, a panel CPU 22, a memory 23, a display 24, an operation panel 25, and a DC-DC converter 26. The memory 23, the display 24, the operation panel 25, and the DC-DC converter 26 are mounted on the panel board 21. The memory 23 stores various programs for controlling components of the operation unit 20. The panel CPU 22 controls the components of the operation unit 20 according to the programs read out of the memory 23.

The display 24 may be a liquid crystal display configured to display setting screens and status conditions of components. The operation panel 25 includes operation keys K1 to K3 through which a user can input instructions and settings. The DC-DC converter 26 converts the DC power supplied by the power supply unit 30 to predetermined-volt DC power, and supplies the converted DC power to the panel CPU 22 and the operation panel 25. Furthermore, the DC-DC converter 26 supplies the converted DC power to the display 24 via a display switch 27. The panel CPU 22 controls on and off of the power supply to the display 24 by closing and opening the display switch 27.

The power supply unit 30 is considered as an example of a power supply. The power supply unit 30 includes a main switch 31 and an AC-DC converter 32. The AC-DC converter 32 is connected to a commercial power source via a power switch 40 that is provided for turning on and off the multifunction device 2. When the power switch 40 is set to on, the AC-DC converter 32 converts AC power supplied by the commercial power source to DC power. The AC-DC-converter 32 then directly supplies the converted DC power to the DC-DC converter 14 of the image processing unit 1 and the DC-DC converter 26 of the operation unit 20.

The power supply unit 30 is connected to the operation unit 20 via a signal line L2. Therefore, the panel CPU 22 can send an instruction for closing and opening of the main switch 31 directly to the power supply unit 30 through the signal line L2 without using the image processing unit 1. Namely, the panel CPU 22 controls a start and a shutoff of the power supply to the image processing unit 1 without using the image processing unit 1. The operation unit 20 switches the power supply unit 30 between the first power supply mode and the second power supply mode.

The communication unit 41 includes a connector 41A to which an external connector of an external device can be connected. The connector 41A may be a network connector or a USB connector provided for communication with the external device. The image processing unit 1 controls the communication unit 41 to exchange image data with the external device (a communication process), the printer unit 42 to print the image data (a printing process), and the scanner unit 42 to scan images on documents (a scanning process). These processes may be considered as examples of image data processing.

Configuration of Printer 3

Figure 2:
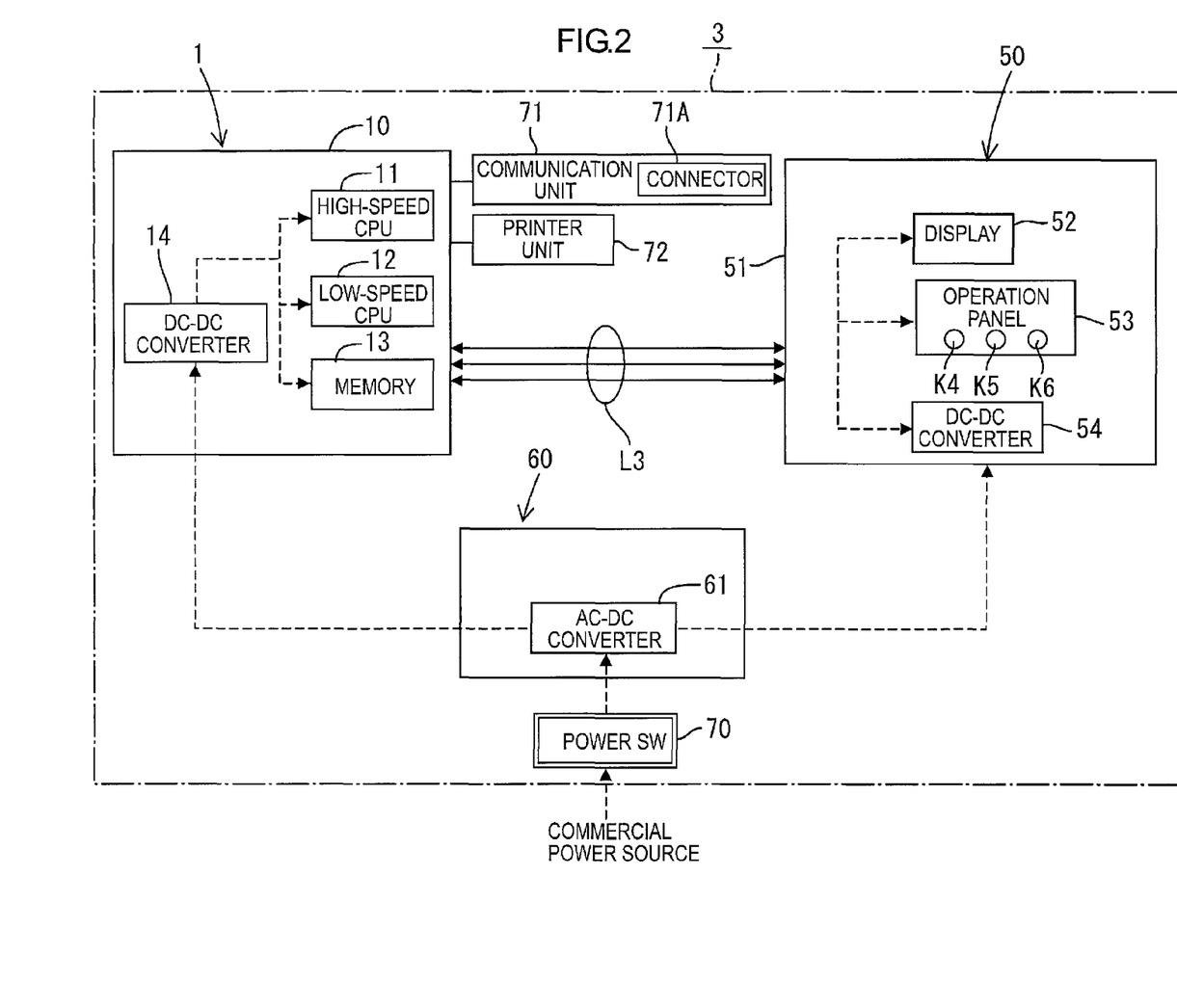
FIG. 2 is a block diagram illustrating an electrical configuration of a printer 3

As illustrated in FIG. 2, the printer 3 includes the image processing unit 1, an operation unit 50, the power supply unit 60, a communication unit 71, and a printing unit 72. The printer 3 does not include an operation unit and a power supply unit having configurations of the operation unit 20 and the power supply unit 30 of the multifunction device 2. Even if the operation unit 50 receives a communication signal from the image processing unit 1, the power supply unit 60 cannot be switched from the first power supply mode to the second power supply mode. Unlike the multifunction device 2, the operation unit 50 of the printer 3 cannot control a start and a shutoff of the power supply to the image processing unit 1.

The operation unit 50 is connected to the image processing unit 1 via communication lines L3 such that the operation unit 50 can exchange data with the image processing unit 1. The communication lines L3 may be parallel control lines. The operation unit 50 includes a panel board 51, a display 52, an operation panel 53, and a DC-DC converter 54. The display 52, the operation panel 53, and the DC-DC converter 54 are mounted on the panel board 51. The display 52 may be a liquid crystal display configured to display setting screens and status conditions of components. The operation panel 53 includes operation keys K4 to K6 through which a user can input instructions and settings. The DC-DC converter 54 converts the DC power supplied by the power supply unit 60 to predetermined-volt DC power, and supplies the converted DC power to the display 52 and the operation panel 53.

The power supply unit 60 may be considered as an example of a power supply. The power supply unit 60 includes an AC-DC converter 61 that is connected to the commercial power source via a power switch 70 that is provided for turning on and off the printer 3. When the power switch 70 is set to on, the AC-DC converter 61 converts the AC power supplied by the commercial power source to the DC power. Then, the AC-DC converter 61 directly supplies the DC power to the DC-DC converter 14 of the image processing unit 1 and the DC-DC converter 54 of the operation unit 50.

The communication unit 71 includes a connector 71A to which an external connector of an external device can be connected. The connector 71A may be a network connector or a USB connector and provided for communication with the external device. The image processing unit 1 controls the communication unit 71 to exchange image with the external device (a communication process) and the printing unit 72 to print the image data (a printing process). These processes may be considered as examples of image data processing.

Sequence Control of Multifunction Device 2

Figure 3:
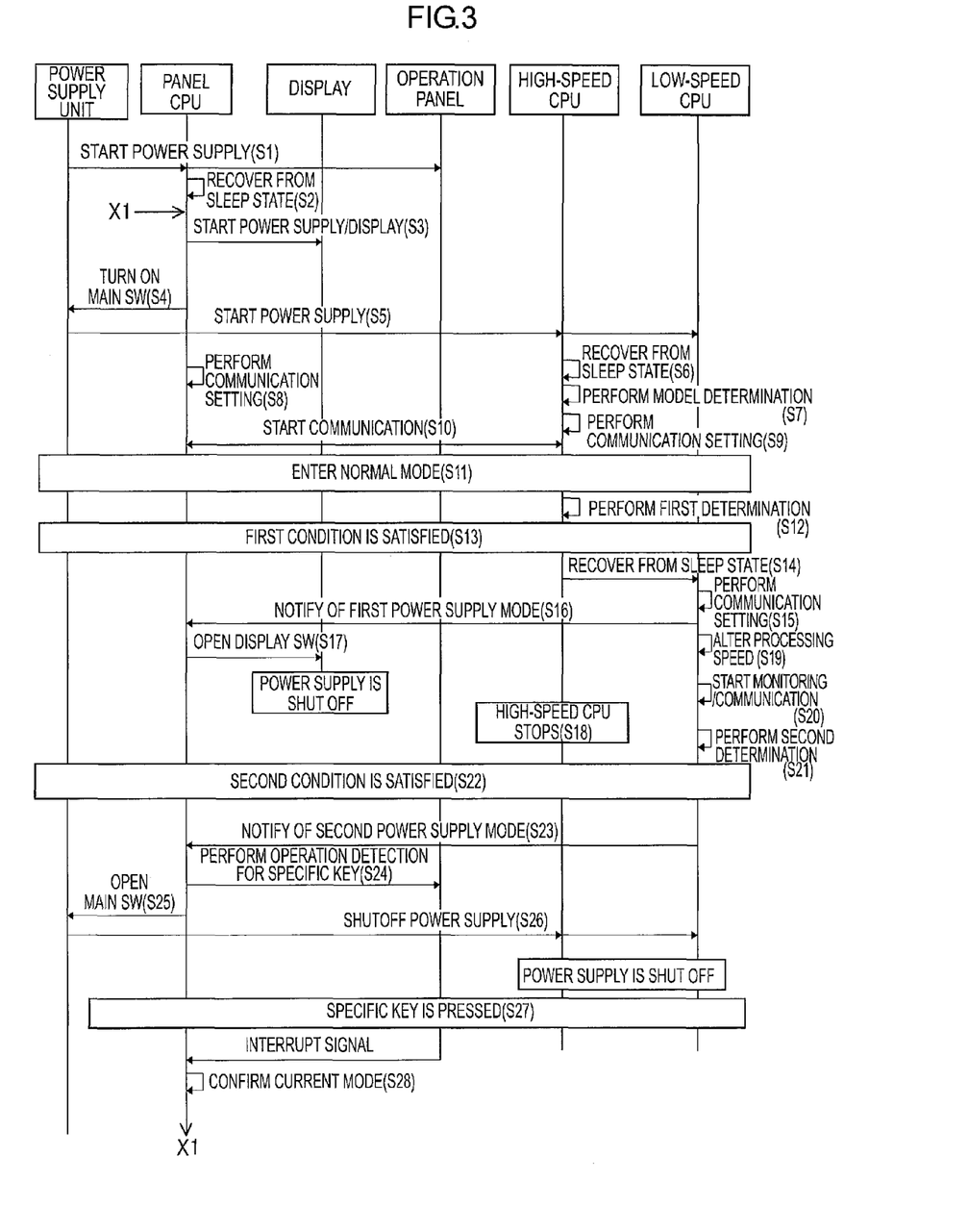
FIG. 3 is a sequence diagram illustrating operations of an image processing unit 1, an operation unit 20, and a power supply unit 30 in the multifunction device 2.

When the power switch 40 of the multifunction is set to on, the power supply unit 30 enters power supply mode. The power supply unit 30 stars supplying power to the panel CPU 22 and the operation panel 25 (S1). As a result, the panel CPU 22 recovers from a sleep state and becomes active (S2). The panel CPU 22 starts an operation detection process for all operation keys K1 to K3 of the operation panel 25 to determine whether an input from the user is accepted based on determination on whether the operation keys K1 to K3 are pressed. Then, the panel CPU 22 closes the display switch 27 and power supply to the display 24 starts. The panel CPU 22 controls the display 24 to display a message such as "Warming up," "Ready," and "Printing" according to a status condition of the multifunction device 2 (S3).

The panel CPU 22 closes the main switch 31 to set the power supply unit 30 in first power supply mode (S4) and power supply to the high-speed CPU 11, the low-speed CPU 12, and the memory 13 (S5) of the image processing unit 1 starts. Namely, power is supplied to the image processing unit 1 and the operation unit 20 in first power supply mode. The high-speed CPU 11 recovers from a sleep state and becomes active (S6). At this time, the low-speed CPU 12 remains in the sleep state, that is, disabled. The high-speed CPU 11 performs a model determination step to determine whether the image processing device including the image processing unit 1 is the multifunction device 2 or the printer 3 (S7). A method of determining the model may include: sending a signal from the high-speed CPU 11 to the operation unit 20 or 50; and determining whether a reply is input. Another method of identifying the model may include: referring information on models stored in the memory 13; and determining the model based on the information.

If the image processing device is the multifunction device 2, the high-speed CPU 11 performs the following steps. The high-speed CPU 11 and the panel CPU 22 perform communication setting steps (S8 and S9). When these steps are complete, the image processing unit 1 and the operation unit 20 starts communicating each other (S10).

When the power supply unit 30 is in first power supply mode, the multifunction device 2 functions in normal mode or first power saving mode. The multifunction device 2 first enters normal mode (S11). In normal mode, the image processing unit 1 immediately starts the printing process or other processes when an input from the user is accepted by the operation unit 20.

In normal mode, the high-speed CPU 11 performs a first determination step to determine whether a first condition to switch the image processing unit 1 from normal mode to power saving mode is satisfied (S12). In first power saving mode, the power supply to the image processing unit 1 continues; however, the power supply to the high-speed CPU 11 stops and the power is only supplied to the low-speed CPU 12. Namely, the high-speed CPU 11 is in a sleep state and the low-speed CPU 12 is active. The first condition may be a condition that elapsed time since the last time when an input is accepted by the operation panel 25 or image data is accepted by the communication unit 41 is equal to first reference time or longer.

If the first condition is satisfied (S13), the high-speed CPU 11 recovers the low-speed CPU 12 from the sleep state (S14). As a result, the low-speed CPU 12 becomes active and performs a communication setting step (S15) to start communication with the operation unit 20. The low-speed CPU 12 sends a notification signal to the panel CPU 22 for notifying that the first condition is satisfied, that is, the multifunction device 2 switches from the normal mode to the first power saving mode (S16). When the panel CPU 22 receives the notification signal, the panel CPU 22 stores notification information related to the notification signal in the memory 23, and opens the display switch 27 to shut off the power supply to the display 24 (S17). Namely, the power supply to the image processing unit 1 and the operation unit 20 continues but the power supply to the high-speed CPU 11 and the display 24 stops in first power saving mode.

The high-speed CPU 11 stops when the communication between the low-speed CPU 12 and the operation unit 20 is established (S18). With this configuration, the communication between the image processing unit 1 and the operation unit 20 is less likely to stop. Because the power supply to the display 24 is shut off and the high-speed CPU 11 is disabled in power saving mode, the power consumption is lower than the power consumption in normal mode.

When the communication between the low-speed CPU 12 and the operation unit 20 is established, the low-speed CPU 12 can perform the operation detection step for all operation keys K1 to K3 of the operation panel 25. The low-speed CPU 12 alters the processing speed thereof to perform the operation detection step every 50 ms (S19). Namely, the low-speed CPU 12 intermittently performs the operation detection step. Therefore, the power consumption of the low-speed CPU 12 can be reduced in comparison to the configuration that the low-speed CPU 12 continuously performs the operation detection step. Instead of the high-speed CPU 11, the low-speed CPU 12 starts monitoring the panel operation and the reception of image data from the external device by the communication unit 41, and starts the communication with the external device in an intermittent manner (S20).

In first power saving mode, the low-speed CPU 12 performs a second determination step to determine whether a second condition to switch the power supply unit 30 from the first power supply mode to the second power supply mode is satisfied (S21). When the power supply unit 30 is in second power supply mode, the multifunction device 2 functions in second power saving mode. In second power saving mode, the power supply to the operation unit 20 continues; however, the power supply to the image processing unit 1 is shut off. The second condition may be a condition that elapsed time since the last time an input through the operation panel 25 is accepted or the image data is received by the communication unit 41 is equal to second reference time or longer. The second condition may be considered as an example of a shutoff condition, and the second determination process may be considered as an example of a shutoff determination process.

If the second condition is satisfied (S22), the low-speed CPU 12 sends a notification signal to the panel CPU 22 for notifying that the second condition is satisfied, that is, the power supply unit 30 is switched from the first power supply mode to the second power supply mode (S23). The panel CPU 22 stores notification information related to the notification signal in the memory 23. Because the operation unit 20 knows that the power supply unit 30 is in second power supply mode based on the notification information, that is, the multifunction device 2 is in second power saving mode, the operation unit 20 smoothly performs a switching process without referring to other units if an input from the user is accepted after the shutoff.

The operation unit 20 performs the operation detection step for the operation key K1 or any specific key among the operation keys K1 to K3 (S24). The operation unit 20 determines that the input is accepted if the operation key K1 is pressed. In comparison to the configuration that the operation detection step is performed for all operation keys K1 to K3, the processing load on the image processing unit 1 and the power consumption thereof can be reduced. The specific key may be the operation key that is frequently used by the user. For example, the operation key for selecting a function or displaying an initial screen on the display may be selected.

When the operation detection step is started, the panel CPU 22 opens the main switch 31 (S25) and performs a shutoff step for switching the power supply unit 30 from the first power supply mode to the second power supply mode. As a result, the power supply to the image processing unit 1 is shut off (S26). In addition to the shutoff of the power supply to the high-speed CPU 11, the power supply to the low-speed CPU 12 is shut off. Therefore, the power consumption can be further reduced.

Even when the power supply to the image processing unit 1 is shut off, the power supply to the operation unit 20 continues. Namely, the panel CPU 22 continues performing the operation detection process continuously or intermittently. Therefore, when the operation key K1 or the other specific key is pressed, the panel CPU 22 determines that the input is accepted based on an interrupt signal sent from the operation panel 25 (S27). The panel CPU 22 refers to the notification information stored in the memory 23 and confirms that the power supply unit 30 is currently in second power supply mode, or the multifunction device 2 is currently in second power saving mode (S28). Then, the panel CPU 22 returns to a point X1 in the sequence diagram in FIG. 3. The panel CPU 22 performs a switching step to switch the power supply unit 30 from the second power supply mode to the first power supply mode by closing the main switch 31. Then, the panel CPU 22 returns to the point X1. With this configuration, the multifunction device 2 directly returns from the second power saving mode to the normal mode without returning to the first power saving mode.

Sequence Control of Printer 3

Figure 4:
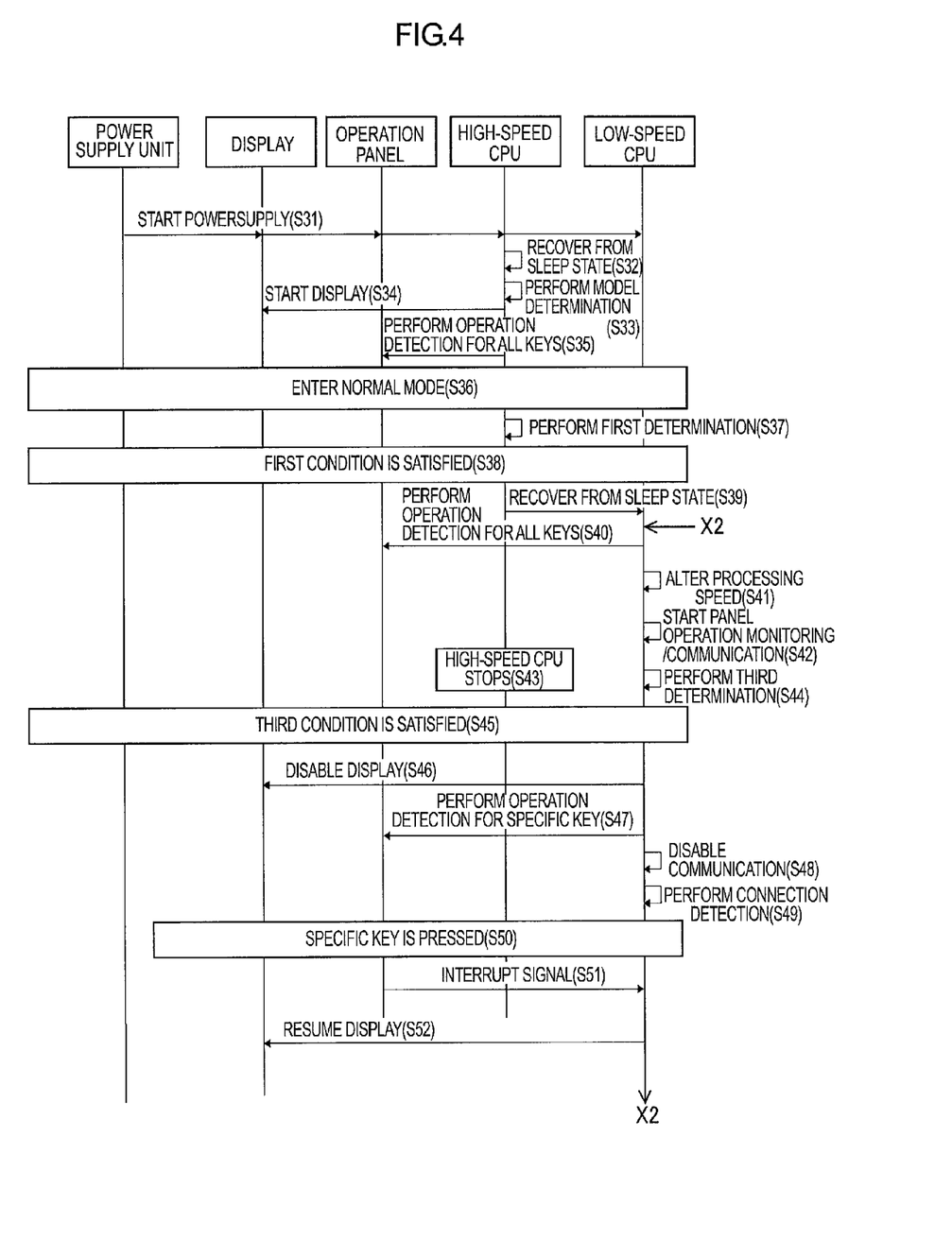
FIG. 4 is a sequence diagram illustrating operations of the image processing unit 1, an operation unit 50, and a power supply unit 60 in the printer 3.

As illustrated in FIG. 4, when the power switch 70 of the printer 3 is set to on, the power supply unit 60 starts supplying power to the image processing unit 1 and the operation unit 50. The power is supplied to the display 52, the operation panel 53, the high-speed CPU 11, and the low-speed CPU 12 (S31). As a result, the high-speed CPU 11 recovers from a sleep state and becomes active (S32). The high-speed CPU 11 performs a model determination step to determine whether the image processing device including the image processing unit 1 is the multifunction device 2 or the printer 3 (S33). If the image processing device is the printer 3, the high-speed CPU 11 performs the following steps.

The high-speed CPU 11 controls the display 24 to display a message such as "Warming up," "Ready," and "Printing" (S34), and performs the operation detection step for all operation keys K4 to K6 of the operation panel 53 (S35). The printer 3 enters normal mode in which the image processing unit 1 can immediately perform the printing process when an input from the user is accepted by the operation unit 50 (S36). In normal mode, the high-speed CPU 11 performs the first determination step to determine whether the first condition is satisfied (S37). If the first condition is satisfied (S38), the high-speed CPU 11 recovers the low-speed CPU 12 from the sleep state (S39). As a result, the low-speed CPU 12 becomes active and performs the operation detection step for all operation keys K4 to K6 (S40).

The low-speed CPU 12 alters the processing speed as in the same manner in step S19 of the sequence control of the multifunction device 2 (S41). Instead of the high-speed CPU 11, the low-speed CPU 12 starts monitoring the panel operation and the reception of image data from the external device by the communication unit 71, and starts the communication with the external device in intermittent manner (S42). After the low-speed CPU 12 alters the processing speed, that is, becomes ready for intermittent processing, the high-speed CPU 11 enters the sleep state (S43).

In first power saving mode, the low-speed CPU 12 first performs a third determination step to determine whether a third condition to switch the printer 3 from the first power saving mode to the second power saving mode is satisfied (S44). The power consumption in second power saving mode is lower than the power consumption in first power saving mode. Therefore, the power consumption of the image processing unit 1 of the printer 3 can be reduced if the third power saving condition is satisfied. The third condition may be a condition that elapsed time since the last time when an input is accepted by the operation panel 25 or image data is accepted by the communication unit 41 in first power saving mode is equal to the second reference time or longer. The third condition may be considered as an example of power saving conditions and the third determination step may be considered as an example of power saving determination steps.

If the third condition is satisfied (S45), the low-speed CPU 12 disables the display 52 (S46). Then, the low-speed CPU 12 performs the operation detection step only for a specific key among the operation keys K4 to K6, for instance, the operation key K4 (S47). If the operation key K4 is pressed, the low-speed CPU 12 determines that the input is accepted. In comparison to a configuration in which the operation detection step is continuously performed for all operation keys K4 to K6, the processing load or the power consumption of the image processing unit 1 can be reduced.

The low-speed CPU 12 disables the communication unit 71 (S48). Then, the low-speed CPU 12 performs a connection detection step (S49). In the connection detection step, the low-speed CPU 12 determines whether the external connector is connected to the connector 71A based on whether a signal is present at the connector 71A or a result of detection performed by a connection sensor (not illustrated). In comparison to a configuration that the reception of data is continuously monitored, the power consumption of the image processing unit 1 can be reduced. If the specific key K4 is pressed (S50), the low-speed CPU 12 determines that the input is accepted based on the interruption signal sent from the operation panel 53 (S51). The low-speed CPU 12 resumes the display (S52) and returns to a point X2 in the sequence diagram in FIG. 4. The printer 3 returns from the second power saving mode to the first power saving mode instead of the normal mode.

Effects

In the multifunction device 2, the power supply unit 30 is switched from the first power supply mode to the second power supply mode if the second condition is satisfied. As a result the power supply to the image processing unit 1 is shut off. In comparison to a configuration that the power is continuously supplied to the image processing unit 1 while the power switch 40 of the multifunction device 2 is set to on, the power consumption can be reduced.

In some known image processing devices, power consumption may be reduced by supplying power only to sub CPUs. In such devices, the power needs to be continuously supplied to the sub CPU to receive an input from the user. According to the technologies described herein, the instruction related to the received input is sent from the operation unit 20 to the power supply unit 30 without the image processing unit 1. The power supply unit 30 switches from the second power supply mode to the first power supply mode. As a result, the power is supplied to the image processing unit 1 and the image processing unit 1 becomes active. Because the power supply to the image processing unit 1 resumes when the operation unit 20 receives an input, the power supply to the image processing unit 1 can be shut off while the operation unit 20 receives no input. Therefore, the power consumption can be reduced.

The operation unit 20 is configured to perform not only the switching step but also the shutoff step for the power supply unit 30. Unlike a configuration that the image processing unit 1 performs the shutoff step and the operation unit 20 performs the switching step, a control line between the image processing unit 1 and the power supply unit 30 is not required. Therefore, the configuration to perform the shutoff step and the switching step can be simplified.

If the image processing device including the image processing unit 1 is the first model, that is, the multifunction device 2, the power supply from the power supply unit 30 to the image processing unit 1 is shut off based on the notification signal if the second condition is satisfied. In comparison to the configuration that the power is continuously supplied to the image processing unit 1 while the power switch 40 of the multifunction device 2 is set to on, the power consumption can be reduced. If the image processing device including the image processing unit 1 is the second model, that is, the printer 3, the notification signal is not output. Namely, the image processing unit 1 can perform the processes appropriate for the first model and the second model, respectively.

In the multifunction device 2, the power supply to the high-speed CPU 11 and the low-speed CPU 12 is shut off and the image processing unit 1 is entirely initialized in second power saving mode. If the power supply is resumed, the multifunction device 2 may need to return to normal mode in which at least the high-speed CPU 11 is active due to higher importance in stability of the control than in reduction of the power consumption and to promptly start the image data processing. The multifunction device 2 has the functions that require immediate starts when the input operation is performed at the operation unit 20, such as the scanning function and the copying function. Therefore, it is especially preferable that the multifunction device 2 returns to the normal mode.

In the printer 3, the power supply to the low-speed CPU 12 is not shut off in second power saving mode. Therefore, the initialization is not required. If the input is accepted, the printer 3 may need to return to the first power saving mode instead of the normal mode in which the high-speed CPU 11 remains disabled due to higher importance in reduction of the power consumption. In the printer 3, the user is required to make a printing request through the external device for executing the printing processing. Therefore, the importance of returning to the normal mode in which the processing is immediately started is not high.

The following reference examples may be included in the technical aspects of the present invention. The configurations of components in the following examples are the same as those of the above embodiments. The following examples do not have the configurations for performing the shutoff determination step and the shutoff step. These processes may be performed by the external device or by the user through the operation unit.

An image processing device includes a image processing unit, an operation unit, and a power supply unit. The image processing unit is configured to process image data. The operation unit is configured to accept an input from a user. The power supply unit is configured to supply power in first power supply mode or second power supply mode. In first power supply mode, the power supply unit supplies power to the image processing unit and the operation unit. In second power supply mode, the power supply unit supplies power to the operation unit but not to the image processing unit. The operation unit is further configured to send an instruction related to the accepted input to the image processing unit if the power supply unit is in first power supply mode. The operation unit is further configured to send the instruction related to the accepted input to the power supply unit without sending the instruction to the image processing unit if the power supply unit is in second power supply mode so that the power supply unit is switched from the second power supply mode to the first power supply mode.

An image processing device includes an image processing unit, an operation unit, and a power supply unit. The image processing unit is configured to process image data. The operation unit is configured to accept an input from a user. The power supply unit is configured to supply power in first power supply mode or second power supply mode. In first power supply mode, the power supply unit supplies power to the image processing unit and the operation unit. In second power supply mode, the power supply unit supplies power to the operation unit but not to the image processing unit. The operation unit is further configured to send an instruction related to the accepted input to the image processing unit if the power supply unit is in first power supply mode. The operation unit is further configured to send the instruction related to the accepted input to the power supply unit without sending the instruction to the image processing unit if the power supply unit is in second power supply mode so that the power supply unit is switched from the second power supply mode to the first power supply mode.

An image processing unit installed in an image processing device including a power supply unit, a communication unit including a connector, and an operation unit configured to accept an input from a user. The image processing unit is configured to: determine whether a predetermined power saving condition is satisfied; monitor whether data is received by the communication unit if the predetermined power saving condition is not satisfied; and stop monitoring the data reception by the communication unit and determine whether the connector of the communication unit is connected to an external connector of an external device if the predetermined power saving condition is satisfied.

<Other Illustrative Aspects>

The present invention is not limited to the illustrative aspects explained in the above description with reference to the drawings. The following illustrative aspects may be included in the technical scope of the present invention, for example.

The image processing unit 1 may be installed only in the multifunction device 2 or the printer 3, and either one of the processes illustrated in FIGS. 3 and 4 may be performed.

The image processing unit 1 may include only one CPU or three or more CPUs. The image processing unit 1 may include a hardware circuit such as an application specific integrated circuit (ASIC). Furthermore, the image processing unit 1 may include both hardware circuit and CPU.

The first model of the image processing device is not limited to the multifunction device 2. The first model of the image processing device may be a printer only having a printing function, a scanner only having a scanning function, and a facsimile machine only having a facsimile function. The first model of the image processing device can be any type of device as long as the operation unit is configured to switch the power supply unit from the first power supply mode to the second power supply mode based on a notification signal from an image reading device.

The operation unit 20 is not limited to the configuration including the panel CPU 22 and the memory 23. The operation unit 20 may not include a CPU and may include a hardware circuit such as an ASIC. The image processing unit 1 may not perform the first determination step or the second determination step, and the operation unit 20 may perform the first determination step or the second determination step.

The image data processing may be processing for display images on the display or processing for converting the image data to predetermined format.

The second model of the image processing device is not limited to the printer 3. The second model of the image processing device may be a multifunction device, a scanner only having a scanning function, and a facsimile machine only having a facsimile function. The second model of the image processing device can be any type of device as long as the operation unit is configured to switch the power supply unit from the first power supply mode to the second power supply mode based on a notification signal from an image reading device.

The multifunction device 2 may be configured such that the power supply unit 30 is switched from the second power supply mode to the first power supply mode when the power switch 40 is cycled while the power supply unit 30 is in second power supply mode.

What is claimed is:

1. An image processing apparatus comprising:
    a power supply device configured to operate in a first power supply mode and a second power supply mode;
    an operation device including a CPU and a display, the operation device being configured to receive an input from a user and switch the power supply device between the first power supply mode and the second power supply mode; and
    an image processing device including a first CPU and a second CPU,
    wherein the power supply device supplies power to the operation device and the image processing device in the first power supply mode, and stops power supply to the first CPU and the second CPU in the image processing device while continuing to supply power to the CPU in the operation device in the second power supply mode,
    wherein one of the CPU in the operation device and the first CPU and the second CPU in the image processing device determines whether a condition to switch the power supply device from the first power supply mode to the second power supply mode is satisfied,
    wherein the CPU in the operation device switches the power supply device from the first power supply mode to the second power supply mode in response to determining that the condition is satisfied,
    wherein the first CPU is configured to:
       determine whether a first condition to switch the image processing apparatus from a normal mode to a first power saving mode is satisfied, the normal mode in which power is supplied to the CPU and the display in the operation device and the first CPU and the second CPU, the first power saving mode in which power is supplied to the CPU in the operation device and the second CPU but not to the display and the first CPU; and
       turn off in response to determining that the first condition is satisfied,
    wherein the second CPU is configured to:
       turn on and transmit a first notification signal to the CPU in the operation device in response to determining that the first condition is satisfied;
       determine whether a second condition to switch the image processing apparatus from the first power saving mode to a second power saving mode is satisfied, the second power saving mode in which power is supplied to the CPU in the operation device but not to the display and the image processing device;
       transmit a second notification signal to the CPU in the operation device; and
       turn off when transmission of the second notification signal is complete, and
    wherein the CPU in the operation device is configured to:
       turn off the display in response to the first notification signal from the second CPU; and
    switch the power supply device from the first power supply mode to the second power supply mode in response to the second notification signal from the second CPU.

2. The image processing apparatus according to claim 1,
    wherein the CPU in the operation device transmits an instruction related to an input from the user directly to the image processing device when the power supply device is in the first power supply mode, and
    wherein the CPU in the operation device transmits an instruction related to an input from the user directly to the power supply device when the power supply device is in the second power supply mode to switch the power supply device from the second power supply mode to the first power supply mode.

3. The image processing apparatus according to claim 2,
    wherein one of the first CPU and the second CPU in the image processing device determines whether the condition is satisfied, and
    wherein the one of the first CPU and the second CPU transmits a notification signal to the operation device in response to determining that the condition is satisfied, and
    wherein the CPU in the operation device determines that the condition is satisfied based on the notification signal.

4. The image processing apparatus according to claim 3, wherein the CPU in the operation device switches the power supply device from the first power supply mode to the second power supply mode in response to determining that the condition is satisfied based on the notification signal.

5. The image processing apparatus according to claim 2,
    wherein the operation device includes a plurality of operation keys, and
    wherein the CPU in the operation device performs an operation detection process allowing some of the operation keys to detect the input from the user when the power supply device is in the second power supply mode.

6. The image processing apparatus according to claim 5, wherein the CPU in the operation device performs the operation detection process for all of the operation keys to detect the input from the user when the power supply device is in the first power supply mode.

7. The image processing apparatus according to claim 1,
    wherein the second CPU consumes less power than the first CPU,
    wherein one of the CPU in the operation device, the first CPU, and the second CPU determines whether a power saving condition to turn off the first CPU is satisfied,
    wherein the first CPU turns off in response to determining that the power saving condition is satisfied, and
    wherein one of the CPU in the operation device and the second CPU determines whether the condition to switch the power supply device from the first power supply mode to the second power supply mode is satisfied.

8. The image processing apparatus according to claim 1, further comprising a communication device configured to receive data from an external device,
- wherein the first CPU monitors data reception by the communication device when the image processing apparatus is in the normal mode,
- wherein the second CPU monitors data reception by the communication device when the image processing apparatus is in the first power saving mode,
- wherein the operation device includes a plurality of operation keys,
- wherein the CPU of the operation device performs an operation detection process for at least one of the operation keys to determine whether the at least one of the operation keys is operated by the user,
- wherein the first condition includes an elapsed time since a last time when the at least one of the operation keys is operated or data is received by the communication device is equal to or longer than a first reference time when the image processing apparatus is in the normal mode, and
- wherein the second condition includes an elapsed time since a last time when the at least one of the operation keys is operated or data is received by the communication device is equal to or longer than a second reference time when the image processing apparatus is in the first power saving mode.

9. An image processing apparatus comprising:
a power supply device;
an operation device including a display;
a communication device connected to an external device via a connector; and
an image processing device including:
- a first CPU configured to operate when the image processing apparatus is in a normal mode in which power is supplied from the power supply device to the image processing device; and
- a second CPU configured to operate when the image processing apparatus is in a power saving mode in which power supply to the first CPU stops, wherein the first CPU determines whether a first condition to switch the image processing apparatus from a normal mode to a power saving mode is satisfied,
wherein the first CPU turns off and the second CPU turns on in response to determining that the first condition is satisfied,
wherein the second CPU determines whether a second condition to reduce power consumption of the image processing device that is in the power saving mode is satisfied,
wherein the second CPU turns off the display in response to determining that the second condition is satisfied,
wherein the operation device includes a plurality of operation keys,
wherein the first CPU performs an operation detection process for all of the operation keys to determine whether the operation keys are operated by a user when the image processing apparatus is in the normal mode,
wherein the second CPU performs the operation detection process for all of the operation keys to determine whether the operation keys are operated by the user in response to determining that the first condition is satisfied,
wherein the second CPU performs the operation detection process for some of the operation keys to determine whether the some of the operation keys are operated by the user in response to determining that the second condition is satisfied,
wherein the first condition includes that an elapsed time since a last time when at least one of the operation keys is operated or data is received by the communication device is equal to or longer than a first reference time when the image processing apparatus is in the normal mode, and
wherein the second condition includes that an elapsed time since a last time when at least one of the some of the operation keys is operated or data is received by the communication device is equal to or longer than a second reference time when the image processing apparatus is in the power saving mode.

10. The image processing apparatus according to claim 9,
wherein the first CPU monitors the data received by the communication device when the image processing apparatus is in the normal mode,
wherein the second CPU monitors the data received by the communication device in response to determining that the first condition is satisfied, and
wherein the second CPU stops monitoring the data received by the communication device and determines whether an external device is connected to the connector in response to determining that the second condition is satisfied.

11. An image processing device to be installed in an image processing apparatus including a power supply device and an operation device including a display, the image processing device comprising:
- a first CPU configured to operate when the image processing apparatus is in a normal mode in which power is supplied from the power supply device to the first CPU and the operation device; and
- a second CPU configured to operate when the image processing apparatus is in a power saving mode in which power is supplied from the power supply device to the second CPU and power supply to the first CPU and the display stops, wherein the first CPU determines whether a condition to switch the image processing apparatus from the normal mode to the power saving mode is satisfied,
wherein the first CPU turns off in response to determining that the condition is satisfied,
wherein the second CPU turns on in response to determining that the condition to switch the image processing apparatus from the normal mode to the power saving mode is satisfied,
wherein the first CPU determines whether the image processing device is a first model or a second model,
wherein the power supply device of the first model is configured to be switched between a first power supply mode in which power is supplied to at least one of the first CPU and the second CPU and a second power supply mode in which power supply to the first CPU and the second CPU stops,
wherein the power supply device of the second model is not configured to be switched between the first power supply mode and the second power supply mode,
wherein the first CPU determines whether the condition to switch the image processing apparatus from the normal mode to the power saving mode is satisfied in response to determining that the image processing apparatus is the first model,
wherein the second CPU determines whether a condition to switch the image processing apparatus from a first power saving mode to a second power saving mode is satisfied in response to determining that the condition to switch the image processing apparatus from the normal mode to the power saving mode is satisfied, and wherein the second CPU transmits to the operation device a notification signal indicating that the condition to switch the image processing apparatus from the first power saving mode to the second power saving mode is satisfied in response to determining that the condition to switch the image processing apparatus from the first power saving mode to the second power saving mode is satisfied, the operation device switching the power supply device from the first power supply mode to the second power supply mode based on the notification signal.

12. The image processing device according to claim 11, wherein the second CPU determines whether a condition to reduce power consumption of the image processing device is satisfied in response to determining that the image processing apparatus is the second model, and wherein the second CPU reduces the power consumption of the image processing device in response to determining that the condition is satisfied.

13. The image processing device according to claim 12, wherein the first CPU and the second CPU are to be connected to a communication device included in the image processing apparatus, the communication device being connected to an external device via a connector, wherein the first CPU monitors data reception by the communication device when the image processing apparatus is in the normal mode, wherein the second CPU monitors data reception by the communication device when the image processing apparatus is in the first power saving mode, and wherein the second CPU determines whether the connector is connected to a device when the image processing apparatus is in the second power saving mode.

14. The image processing device according to claim 12, wherein the second CPU determines whether a plurality of keys included in the image processing apparatus are operated by a user when the image processing apparatus is in the first power saving mode, and wherein the second CPU determines whether some of the plurality of keys are operated when the image processing apparatus is in the second power saving mode.

15. The image processing device according to claim 14, wherein the second CPU establish communication with the operation device, and wherein the second CPU determines whether at least some of the plurality of keys included in the image processing apparatus are operated by the user through the communication.

16. The image processing apparatus according to claim 11, wherein the second CPU consumes less power than the first CPU.

* * * * *